G. W. BELL.
ANTIVIBRATION DEVICE FOR AUTOMOBILES.
APPLICATION FILED OCT. 10, 1914. RENEWED MAY 20, 1918.
1,288,475.
Patented Dec. 24, 1918.
5 SHEETS—SHEET 4.
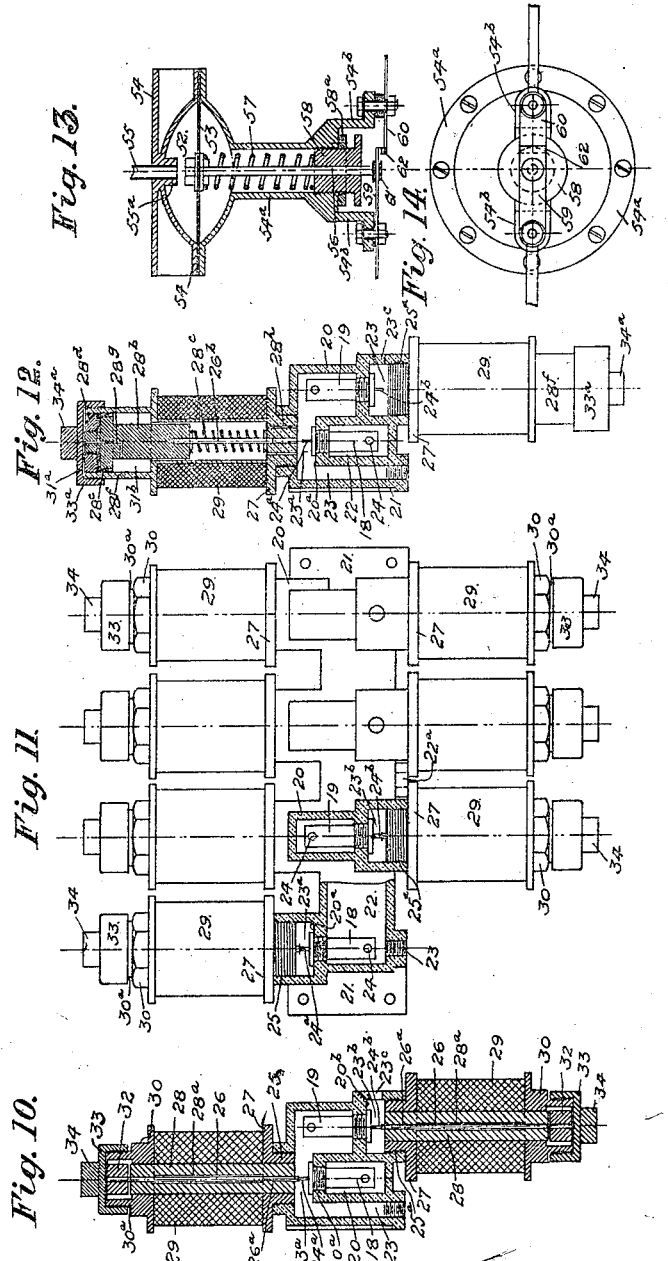
WITNESSES:
INVENTOR
George William Bell,
BY
ATTORNEYS

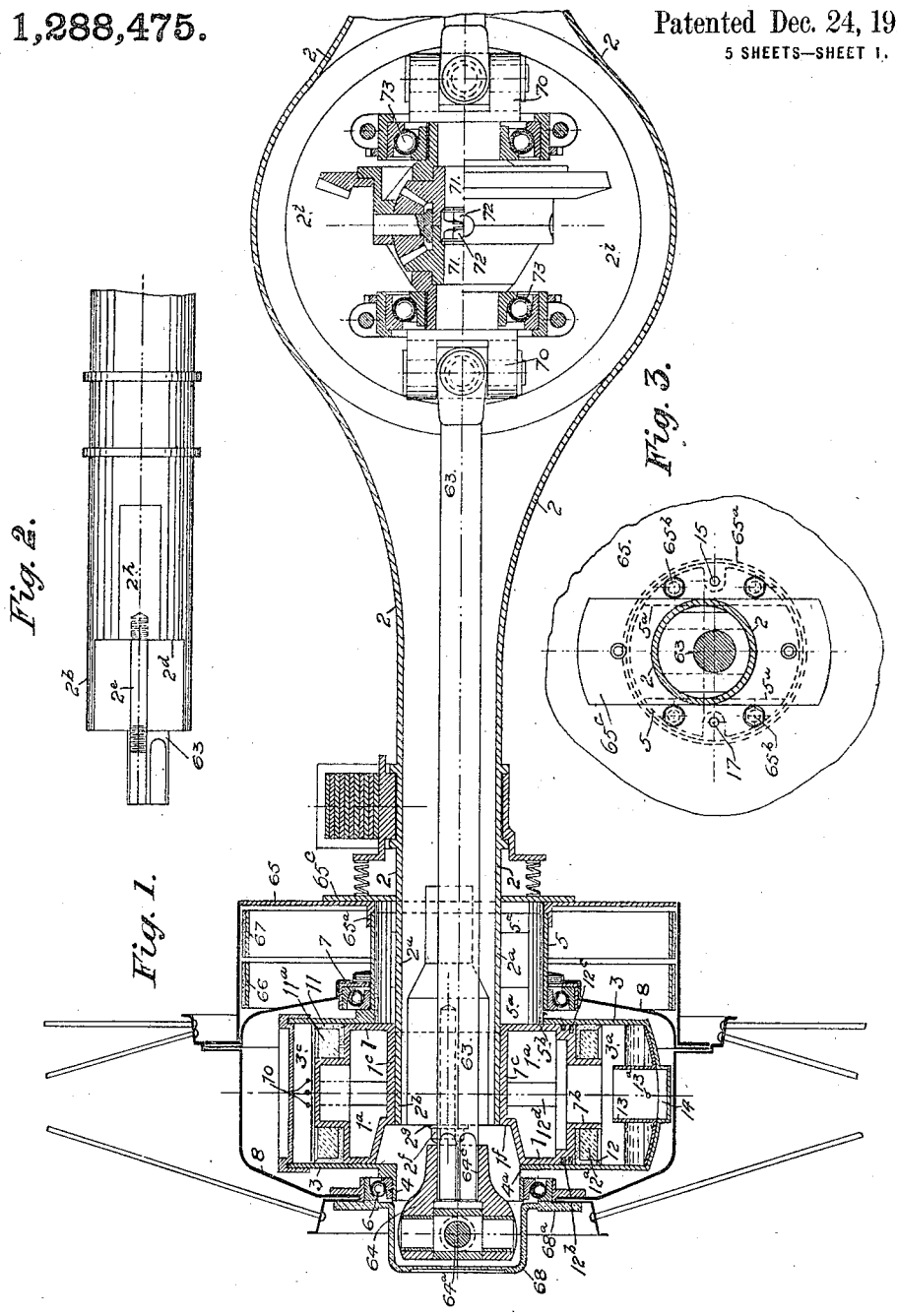

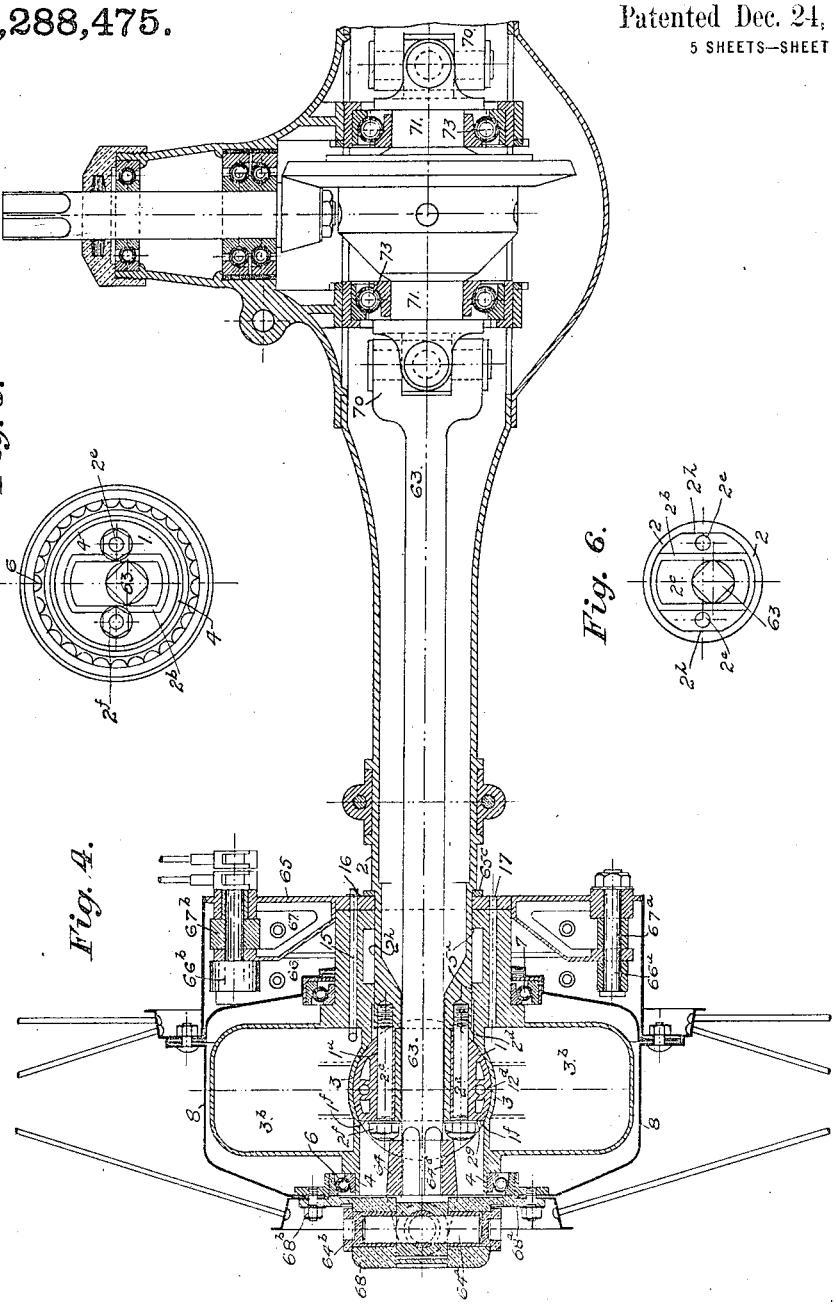

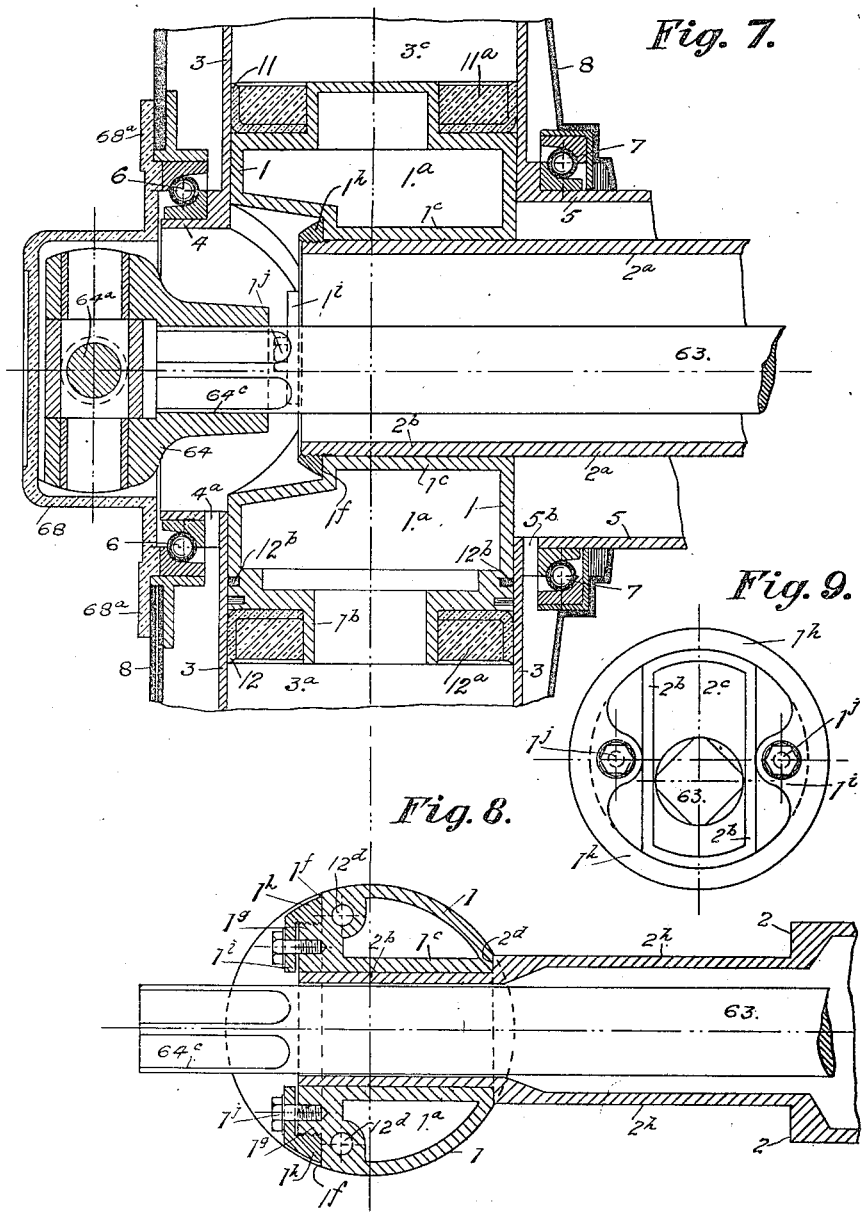

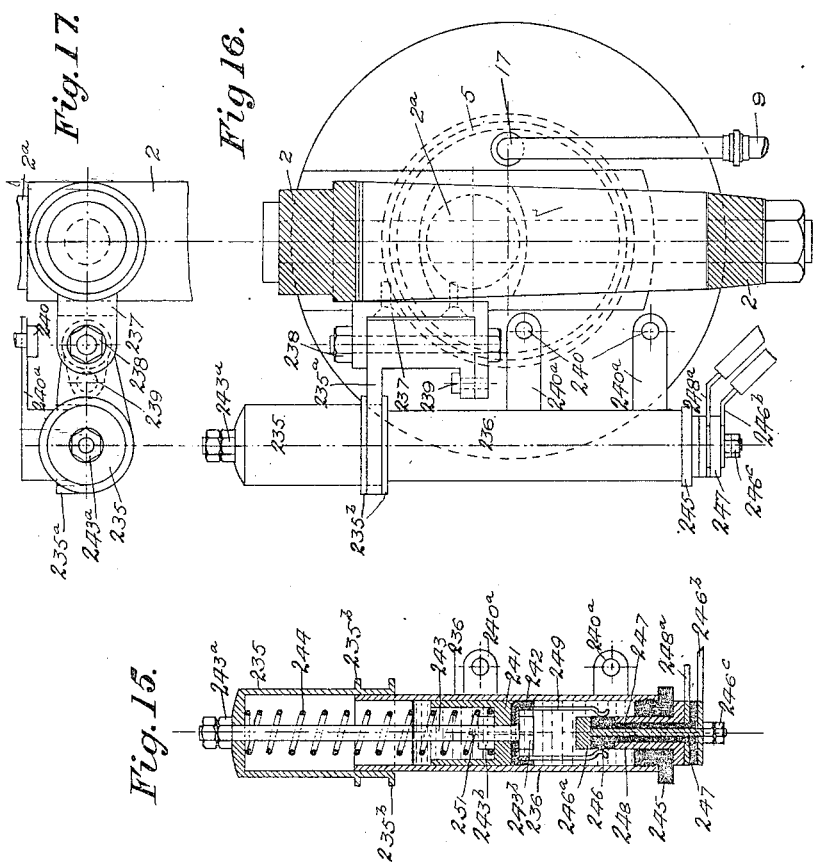

UNITED STATES PATENT OFFICE.

GEORGE WILLIAM BELL, OF DETROIT, MICHIGAN.

ANTIVIBRATION DEVICE FOR AUTOMOBILES.

1,288,475. Specification of Letters Patent. Patented Dec. 24, 1918.

Application filed October 10, 1914, Serial No. 866,000. Renewed May 20, 1918. Serial No. 235,725.

*To all whom it may concern:*

Be it known that I, GEORGE WILLIAM BELL, a citizen of the United States of America, residing at Detroit, Mich., have invented certain new and useful Improvements in Antivibration Devices for Automobiles, of which the following is a specification, reference being had therein to the accompanying drawings.

This invention relates to anti-vibration devices of the piston or plunger and cylinder type, as applied between the wheels and axles or bodies of automobiles and like vehicles but more particularly to that type disposed between the wheels and axles and in the hub of the wheel, and has for its objects to provide simple and accessible means of automatically controlling the pressure and the volume of air in the said device to correspond to variations of the load without being affected by the average road shock and vibration; such automatic control therefore maintaining the piston in the cylinder of the device in a predetermined position, and exerting a practically constant resistance during vibration or undulatory movement of the axle or wheels, so that any change in the load automatically causes the pressure to be regulated to meet the said variation, and this with the least possible loss or expenditure of air. Furthermore, means are provided for mounting such wheels embodying the said type of suspension device in the plane or hub of the latter, on the rear axle housing and for driving the same from the motor by means of the usual shaft contained therein, in a manner to permit the said wheels oscillating freely in the vertical plane under the action of the said pneumatic devices contained therein, and to enable them to be readily mounted and dismounted from the axle when required and to provide for this with a form of construction that will be light, strong and simple of production.

My invention is shown in the accompanying drawings, in which,

Figure 1 is a cross vertical section of a pneumatic device of the piston and cylinder type disposed in the hub of the rear wheel showing the arrangement of the shaft drive.

Figs. 2 and 3 are, respectively details of the end of the axle housing and a section through the latter.

Fig. 4 is a sectional plan through the said pneumatic device.

Figs. 5 and 6 are, respectively front elevation of the arm of the cylinder bearing, and the front elevation of the end of the axle housing.

Figs. 7, 8 and 9 are, respectively a cross section of the piston and cylinder of the device illustrating the method of securing the piston to the axle by a ring, and a cross sectional plan of the said device, also an end elevation of the axle and ring.

Figs. 10 and 11 are, respectively a cross sectional elevation and a front elevation partly in section of the electro-magnetically operated inlet and outlet valves.

Fig. 12 is a cross sectional elevation of a similar valve with a modified electro-magnetic mechanism.

Figs. 13 and 14 are, respectively sectional elevation and plan of a pneumatic safety switch.

Fig. 15 is a sectional elevation of an electric switch with liquid dash-pot mechanism controlling the air inlet and outlet valves.

Figs. 16 and 17 are, respectively an elevation and plan showing a similar switch to Fig. 15, in its position on the front axle.

Figs. 18 and 19 are, respectively a sectional elevation and a plan of electric switch with air dash-pot.

Referring first to the means of controlling the air under pressure from the source of supply to the said respective devices, of the type shown in Figs. 1 and 2 of the drawings, piston 1 is secured to the axle housing 2 in the vertical plane and the cylinder 3 operates therewith having hollow arms 4, and 5, adapted to envelop the axle end $2^a$ and be guided thereon and permitting a predetermined vertical displacement.

On the outside periphery of arms 4 and 5, the bearings 6 and 7 of the wheel are mounted and revolve.

Air under pressure is supplied to the chamber $3^a$ and reservoir $3^b$ from a compressor, driven by the engine or motor of the vehicle preferably through an air reservoir through suitable piping.

Air chambers $3^a$ and $3^c$ are formed in the cylinder 3 in the suspension device, one above and one below the axle end $2^a$. Piston 1 which is secured to the axle $2^a$ in the vertical plane engages in these chambers and coöperates therewith to form two air cushions, the one below the axle forming the air cushion or air-spring which yieldingly supports the weight upon the wheel and the other operating as a dash-pot or check-spring to check the vertical play of the cylinder and wheel supported thereon. The dash-pot $3^c$ communicates with the atmosphere under the control of the piston 1 through vent holes or ports 10 in the wall of the cylinder 3.

The upper and lower ends of piston 1 are provided with suitable cup leather packing rings 11 and 12 secured and held in position by the aluminium rings or washers $11^a$ and $12^a$ and counter-sunk set screws. The lower periphery of the piston 1 is also provided with piston-rings $12^b$ and an oil groove $12^c$ in communication through a vertical conduit $12^d$ with the upper air-spring chamber $3^c$. This conduit and groove afford means of automatically lubricating which assists in maintaining the packing air-tight. Oil is stored in a reservoir on the side of the upper cylinder 3, this communicates with the upper dash-pot $3^c$ by means of the ports 10. The oil drawn in with the air from the said reservoir as the piston 1 descends in the cylinder 3, is forced on the upward stroke of the former through the conduits $12^d$ to the groove $12^c$. The oil leaking past the packing ring $12^b$ is discharged through ports $4^a$ and $5^b$ in the lower part of the arms 4 and 5 into the revolving hub 8 which collects and returns it to the reservoir.

Both ends of the piston 1 are hollow and form air chambers $1^a$ which communicate with each other and the lower air chamber $3^a$ in a manner as to form an enlargement of the lower chamber $3^a$. A further augmentation to this chamber is formed by reservoirs $3^b$ disposed on each side of the cylinder 3 which communicates with $3^a$ through the central ferrule 13 and passage 14.

The ferrule 13 is also adapted to telescope with opening $1^b$ to form a dash-pot in the annular chamber formed between the cylinder 3 and ferrule 13, which when the piston 1 descends and engages with the ferrule, forces the oil in the said dash-pot slowly through the vent holes $13^a$ to prevent final concussion should the resistance of the air-spring over the greater part of the displacement provided be not sufficient to arrest the oscillation caused by excessive shock from the road.

Conduit 15 which extends to the bottom of the reservoir $3^b$ to a required level enables the correct amount of oil being inserted by the removal of the plug 16 and a force pump and connection applied. The excess oil is driven out through the same conduit by a little air pressure turned into the device. The cap is then replaced and made tight.

Air is supplied to the device through the conduit 17 which is formed in the arm 5 from a compressor or reservoir through suitable piping and flexible coupling hose 9, Fig. 16.

To control the supply and the pressure of air in the chamber $3^a$ and reservoir $3^b$ of the device, so that the pressure shall at all times be just sufficient to support and maintain the piston 1 in its predetermined position of suspension in the cylinder 3 and in a state of equilibrium, the electro-magnetically operated valves shown in Figs. 10 and 11 are disposed on each of the conduits leading to the respective devices of the four wheels and in an accessible location, in this case on the side and in the battery box attached to the running board of the vehicle.

Referring now to Figs. 10 and 11 the four inlet valves 18 and outlet valves 19 required for a complete installation of the suspension to a vehicle, are preferably formed in one casting 20 secured conveniently to the inside of the battery box by lugs 21.

The casting forms a common supply chamber 22 and four passages 23 communicating with each of the respective devices and the valve chambers $23^a$. Air from the source of supply enters the chamber 22 by the opening $22^a$ and suitable piping in communication therewith.

Valves, preferably similar to those used in a pneumatic tire, are screwed into the case or tube of the valve 18 adapted to receive the same and be made air tight. The tube 18 is screwed into the valve deck $20^a$ through the opening 25 and made air tight. The tube 18 is also provided with an opening 24 in the lower end of same to permit the air to pass.

The valve spindle $24^a$ extends into the chamber $23^a$ and when depressed by the push-rod 26 forces the valve from its seat against the pressure of the spring and air, the latter forcing the valve to its seat and raising the rod when the magnet is de-energized.

Into the opening 25 the cap 27 is screwed carrying the electro-magnetic core 28 and the winding 29 and made air tight by means of the wrench grip 30. The brass casting $30^a$ which is attached to the iron core also forms a chamber adapted to accommodate the armature 32 over the outer face of the magnet core 28. The said chamber is in communication with chamber $23^a$ through opening $28^a$. The space between the face of the magnetic core 28 and the armature 32 is regulated to the lift of the valve as desired. This space usually being small enables the maximum power of the magnet being utilized to force the valve from its seat. The outward movement of the armature 32 is limited by the depth of the said chamber and the cap 33 so that it is always within the effective power of the magnetic field through the core 28.

From the lower face of the armature 32 the brass push-rod 26 extends through the aperture 28$^a$ which passes through the core 28. The rod is loosely guided at its ends by the enlarged aperture of the portion 26$^a$ so that the air may pass to the armature chamber.

The cap 33 when removed permits the armature 32 to be inserted and regulated to the requirements of the valve 18. When the cap is replaced it is made air tight by means of the wrench grip 34.

The blow off or outlet valve is disposed in the tube 19 which is screwed into the valve deck 20$^b$ through the opening 25$^a$ in the lower face of the casting so that it extends into the chamber 23$^a$ in communication with the pneumatic device. The valve spindle 24$^b$ extends into the chamber 23$^b$ which is open to the atmosphere at 23$^c$, and is adapted to be depressed by the push-rod 26 similar to that above described in reference to the inlet valve 18.

To control and actuate the respective valves so as to maintain the vehicle in the desired position of suspension, a switch arrangement shown in Fig. 15 of the drawings is provided for operating these valves, the same being disposed between the axle and the hub of the wheel and being operated by the relative movements of the same.

Referring now to Fig. 15 of the drawings the two telescoping tubes 235 and 236 are disposed in the vertical plane between the wheel and the axle, the upper tube 235 being attached to the axle or housing 2, as shown in Figs. 16 and 17 which shows the switch as applied to the front wheel, by means of an arm 235$^a$ which is forked and designed to engage with the tube 235 between the collars 235$^b$, and is attached to the axle by means of the bracket 237 Fig. 16.

In order to facilitate the removal of the switch for inspection or adjustment without disturbing the wheel to disengage the tube 235 from the bracket or arm 235$^a$, the latter forms a hinge with the bracket 237 and is provided with a lug and pin 239 to secure it when in position from turning. Should it be desired to remove the switch, it is done by loosening the nut 238 and lifting the pin 239 from the lug and swinging back the bracket or arm 235$^a$ thereby disengaging the tube 235. The switch can then be removed from the wheel by unscrewing the bolts 240 which pass through lugs 240$^a$ and which secure it to the arm 5 of the cylinder 3 of the suspension device.

The lower tube 236 contains piston 241 fitted with cup leather 242 and rod 243 terminating through the upper end of the tube 235 with nut 243$^a$ and locknut. The opening through 235 acts as a guide to the rod 243. The nut 243$^a$ is adapted to engage with the upper face of the tube 235 when the latter is moved upward.

Between the piston 241 and upper tube 235 a suitable spring 244 is provided of a length such that when the piston 1 in the cylinder 3 of the suspension device is in the normal position of suspension, and piston 241 is in its correct position in the tube the spring extends between the parts without substantial compression and in this position the nut 243$^a$ normally engages with the tube 235.

In the lower part of the tube 236 two electrical terminals are provided and are preferably disposed in the form of a plug 245 which is screwed into the lower end of the tube 236.

The plug is formed of a centrally disposed rod 246 having an enlarged head at the upper end, the lower end terminating in a connection for the electric circuit 246$^b$ which is secured by nuts 246$^c$ and forms the circuit to the control outlet valve. The rod 246 is insulated by a hard rubber sleeve 247 the upper end of which is provided with a section of similar diameter to that of the conductor 246$^a$ and of the required length to form an insulated strip between the terminal contacts of the conductors to the inlet and outlet valves. Outside, and concentric with these is disposed a second metal tube 248 terminating at its upper end in a section of same diameter as the head of the conductor 246$^a$ and the insulated section 247 and of the required length. The lower end forms the terminal for the conductor 248$^a$ of the circuit controlling the inlet valve. Outside these conductors and concentric with them a further sleeve of insulating material 245 provides means for insulating the respective conductors from the telescoping tubes and the ground or chassis.

This plug provides vertically disposed cylindrical contact terminals inside the tube 235 adapted to engage with a sliding switch terminal 249, the upper head 246 forming the contact for the circuit to the escape valve 19 and the lower contact 248 which is separated by the section of insulation material from 246, for the circuit to the inlet valve 18.

To enable the circuit to be closed the switch terminal 249, is preferably a slitted tube, extending from the lower face of the piston 241 to which it is secured by a nut 243ᵇ attached to the end of the rod 243. The switch terminal 249 extends sufficiently from the piston 241 to enable its lower end engaging with the necessary pressure the contacts 246 and 248 without the head 243ᵃ coming into contact with 246.

The switch terminal 249 also forms the washer to secure the cup leather 250 (if used for packing) to the lower face of the piston 241.

When the piston 1 in the cylinder 3 of the suspension device is in the correct normal position the switch contact 249 rests on the insulated material disposed between the two terminals 246ᵃ and 248 both circuits are then open and the inlet and outlet valves 18 and 19 are closed.

Disposed in the lower part of the tube 236 above and below the piston 241 glycerin or oil is provided. A vent 251 passing through the lower end of the piston rod 243 affords restricted communication between the upper and lower faces of the piston 241 for the fluid to pass from the lower to the upper face of the latter when it is forced downward by the action of the spring 244 due to the relative displacement of the respective parts of the suspension device.

The method of connecting the electric circuits to the respective valves is preferably the single wire system. The circuit being taken from one terminal of the battery or dynamo to one of the respective terminals of the electromagnets of the inlet and outlet valves, the other respective terminals of the coils being connected with the respective terminals of the switch plug 45 of the switch attached to the respective wheel which the valves control. The closing of either circuits by the switch grounds the current to the chassis frame, the latter being connected to the other terminal of the battery through a hand switch preferably operating in conjunction with the air valve on the supply conduit, and a pneumatic switch, shown in Figs. 13 and 14 of the drawings, the latter being in series in the circuit with the hand switch.

The switch referred to and shown in Figs. 13 and 14 consists of an air tight chamber 52 in which a flexible diaphragm 53 of suitable material is secured on the main body 54 by a properly flanged upper part clamped thereon by screws or other suitable means. The chamber is provided with an air conduit 55 terminating in a boss 55ᵃ which also acts as a safety stop to support the diaphragm when the suspension device is deflated, the rod end 56 then rests thereon and supports the pressure of the spring 57.

The rod 56 is centrally attached to the diaphragm 53 by suitable collars and nuts. The diaphragm 53 is supported on its outer face by the spring 57, the pressure of which on the same may be regulated by the screw plug 58 adapted to screw into the tube or body 54ᵃ. A lock-nut 58ᵃ secures the plug from moving when set.

Brackets 54ᵇ are extended from the tube 54ᵃ and are designed to carry the spring terminal contacts 59 and 60 which are respectively insulated from the body or tube 54ᵃ. Terminal screws are also provided to connect the conductors to the same. The terminal 59 is provided with an insulated button 61 upon which the spindle 56 presses when the diaphragm is extended outward by the pressure of the air compressing the spring 57.

In operation the spring 57 is adjusted to balance a predetermined air pressure in the chamber 52 high enough to support the vehicle in the respective suspension devices. With the high normal pressure of the air in the reservoir which is considerably in excess of the amount ever required to support the weight of the car fully loaded, the spring 57 is held compressed and the rod 56 is forced outward against the button 61 and terminal spring 59 forcing the latter outward until it makes contact at 62 with the terminal 60 so closing the circuit. Should the pressure in the chamber 52 and the system be reduced to a point below that necessary to support the vehicle and compress the spring 57, the diaphragm is forced inward by the latter carrying the rod 56 releasing the pressure of the spring contact 59 which breaks contact at 61 and opens the circuit.

Referring now to the operation of the inlet and outlet valves and the control switch to regulate the supply of air to and from the device, when the vehicle is in the normal position of suspension the tubes 235 and 236 of the switch are relatively so disposed that the piston 241 is held by the rod 243, nuts 243ᵃ and tube 235 as to permit the switch contact 249 to rest on the insulated portion 248 of the plug 245, both circuits are therefore open, and the valves closed.

Should there be an increase of the load supported by any of the wheels, piston 1 in the cylinder 3 of the suspension device so affected will be forced downward, the tube 235 will also be forced downward compressing the spring 244 and forcing the piston 241 to descend; owing however to the restricted passage 251 the flow of the fluid to the upper face of the piston is slow. This retards the movement of the latter and some little time must elapse before it is forced low enough to permit the switch 249 engaging with the lower terminal 248, when the circuit is closed by grounding the same through the body of the switch to the chassis. The inlet valve 18 is thereby opened by the action of the magnetic attraction of the core 28 on the armature 232 which by means of the push-rod 26ª presses the valve from its seat and permits air to flow to the suspension device.

As the pressure of air increases in the device the piston 1 of the same carrying the load rises and assumes its normal position of suspension, and simultaneously the tube 235 of the switch device engages with the nut 243ª raising the piston 241 and the switch contact 249 until the latter slides from the terminal 248 to the insulated section 247 of the plug 245 and opens the circuit so closing the valve.

When the load on the vehicle is reduced and the excess of air pressure in the suspension device thereby forces the piston 1 to the upper part of the cylinder 3, the tube 235 of the switch rises together with the piston 241 and switch contact 249 until the latter contact engages with the upper terminal 246ª of the plug 245, thus closing the circuit and energizing the magnet 28 of the outlet valve. This causes the armature 232 to be attracted to the core 28 so that the push-rod 26ª engages with the valve spindle 24ᵇ and opens the relief valve to permit the escape of air from the device.

When the vehicle meets obstruction in the road causing vibration and oscillation of the piston 1 in the cylinder 3 of the suspension device, such displacements will be communicated to the upper tube 235 of the switch and the spring will be compressed and expanded; but owing to the short duration of such displacements there is no time for the momentary pressure of the spring to move the piston 241 against the resistance of the flow of the liquid from one side of the piston to the other, the circuit is therefore not closed and the valves remain closed.

Figs. 18 and 19 of the drawings illustrate an alternative form of switch having the same general characteristic as that described above with the exception that in place of using a liquid dash-pot formed by the piston 241 in the lower end of the tube 236, an air dash-pot is substituted; this latter arrangement being preferable under circumstances where excessive cold may be experienced which might tend to freeze or alter the degree of viscosity of the liquid.

This form of construction comprises a tube 136 adapted to be attached to the cylinder 3 or the reciprocating element of the pneumatic device in the wheel, the tube having a plug 145 in its lower end. Disposed in this tube 136 is a vertical reciprocating piston 141 having spring terminal contacts 149 attached to and extending below the same to envelop and engage with the vertical periphery of the terminal plug 145. Above the piston 141 in the central part of the tube 136 a piston head 135 is disposed. The latter is provided with removable gudgeon pins 135ᶜ extending through the openings 136ª in the sides of the tube 136. The openings accommodate whatever displacement is provided in the suspension device to which the said switch is attached. The piston 135 is attached to the axle or part thereof by means of a forked bracket 135ª which engages with the gudgeon pins 135ᶜ. Since the piston 135 and tube 136 are respectively attached to the piston 1 and cylinder 3 of the suspension device, any relative movement between the same will also occur between the piston 135 and tube 136. Movement of the piston 141 is transmitted from the reciprocating piston 135 in a downward direction through spring 144 disposed between the lower face of the piston 135 and the upper face of the piston 141. The upward movement is transmitted by means of the tube 141ᵇ which is screwed into or attached to the lower piston 141 and extends through an opening in the piston 135 in which it is adapted to slide freely, the upper end of the said tube terminating in a flange or washer 141ᶜ screwed or attached to the tube 41ᵇ. The length of the latter is adjusted so that when the piston 1 in the cylinder 3 of the suspension device is in its normal position the said flange 141ᶜ will engage with the upper face of the piston 135 and hold the contact terminals 149 on the insulated portion of the plug 145. To damp the downward movement of the piston 141 when actuated by the movement of the piston 135 through the spring 149 a dash-pot 136ᵇ is formed between the upper end of the tube 136 and a piston 141ª the latter being provided with cup leather packing 150 to prevent ingress of air to the dash-pot, but which is free to permit leakage past it from the dash-pot on the upward stroke. To permit the piston 141 to slowly descend under the sustained pressure of the spring 144 a vent 51 is provided in the upper end of the tube 136 with a cap 51ª adapted to regulate the flow of air into the dash-pot 136ᵇ. The downward movement of piston 141 is transmitted to the piston 141ª through piston-rod 143 which is attached to the latter and passes freely through the tube 141ᵇ to the lower side of the piston 141 terminating in a nut 143ᵇ secured to it. When the piston 1 is in the normal position of suspension in its cylinder it engages with the piston 141. The upward movement of the dash-pot piston 141ª is effected by the piston 135 through a comparatively stiff spring 144ª disposed between the upper face of the flange 141ᶜ and the lower face of the piston 141ª. The spring 144ª is arranged in length to be free from compression when the piston 135 is in the normal position in the tube 136 with the piston 141ª at the upper end of the said tube.

In action when the load is increased on the piston 1 in the cylinder 3 of the device to which the switch is attached, the piston 135 is forced downward compressing the spring 144 on the piston 141 driving it downward slowly against the resistance of the dash-pot piston 136ᵇ, which, as it descends tends to form a vacuum in the dash-pot 36ᵇ, the movement being proportioned to the leakage of air into same through the vent 151, till contact 149 engages with the terminal 148 and closes the circuit to the inlet valve. As the piston 1 in the cylinder 3 of the device rises and assumes its normal position, piston 135 also rises and coming in contact with the flange 141ᶜ raises piston 141 and contact 149 until the latter rests on the insulated section 147 of the plug 145 and opens the circuit so closing the valve to the supply of air.

Again when the load is decreased on the piston 1 of the device, the excess air pressure forces the piston to the upper part of the cylinder 3 and into the dash-pot 3ᶜ thereof, thereby lifting the piston 135 in the tube 136. This movement is transmitted to the piston 135 and piston 141 the former engaging with the flange 141ᶜ until the terminal contact 149 engages with the upper terminal 146ᵃ of the plug 145 closing the circuit and opening the blow-off valve.

The spring 144ᵃ is provided to permit of the displacement of 135 above the normal position when 141ᵃ of the dash-pot is at the upper end of the tube. The spring 144 is made stiff enough to force the piston 41ᵃ upward without substantially compressing the same.

When the vehicle meets obstructions on the road causing oscillations of the piston 1 in the cylinder 3 of the suspension device, the displacements are transmitted to the springs 144 and 144ᵃ without actuating the piston 141 sufficiently to close the circuits owing to the reluctance of the movement of the same due to the dash-pot action referred to, and since the oscillations of the said parts above the normal are regulated and controlled by the dash-pot 3ᶜ of the suspension device, and the length of the insulation section 147 of the plug 145 is arranged that the circuit can only be closed when the piston 1 is driven to a predetermined position into the dash-pot 3ᶜ of the said device, the circuit is therefore not closed except by an excessive pressure existing in the suspension device.

In lieu of the damping or retarding effect to the opening of the said valves being disposed in the switch as herein described, an alternate form comprising a simple switch formed by reciprocating contact terminals is applied between the axle and wheel in a similar manner to that afforded by the sliding parts 49 and the terminal plug 145, and the damping effect is applied to the electro-magnetic mechanism of each valve.

Fig. 12 of the drawings illustrates such an arrangement. The general arrangement of the valve casting or body and their parts may be similar to those shown in Figs. 10 and 11, but in lieu of the electromagnet having a fixed iron core through the coil 29 it forms a solenoid in which the armature 28ᵇ is of soft iron supported by the spring 28ᶜ in the upper part of the tube and weaker part of the magnetic field. The armature 28ᵇ is provided with a piston 28ᵈ at its upper end and adapted to operate preferably in an enlarged diameter cylinder 28ᶠ. The piston is fitted with packing ring 28ᵉ and is adapted to operate in the cylinder 28ᶠ which is in communication with the chamber 23ᵃ by means of opening 28ʰ and the core tube. A cap 33ᵃ with wrench grip 34ᵃ is provided to close the chamber 31ᵃ and make it air tight. A vent 28ᵍ permits ingress of air to the dash-pot from the space 31ᵇ when the piston moves down or inward.

In operation when the load is increased and the piston 1 descends in the cylinder 3 of the device the circuit to the inlet valve is closed through the switch disposed between the axle and wheel, and the coil 29 is energized and draws the armature 28ᵇ into the tube against the action of the spring 28ᶜ and against the action of the dash-pot 31ᵃ which permits its slow descent. The push-rod 26, being short, is free to travel some distance before engaging with and depressing the valve spindle 24ᵃ to open the valve to let air in.

As piston 1 in the cylinder 3 of the device assumes its normal position the circuit is broken by the switch disposed between the wheel and axle and permits the armature 28ᵇ to be forced outward by the spring 28ᶜ. The air from the dash-pot passes through the vent 28ᵍ and may also pass the packing ring 28ᵉ with comparatively small resistance.

The outlet valve operates in a similar manner.

When the vehicle meets obstructions in the road causing the piston 1 to oscillate or vibrate in the cylinder 3 of the device, the reciprocating switch between the wheel and axle will rapidly make and break the circuit if the amplitude of the displacement is large enough to permit the terminals engaging, but owing to the retarding effect of the dash-pot 31ᵃ on the armature 28ᵇ such duration of the circuit being made does not permit the valve being operated before the circuit is again broken by the relative parts assuming their normal position. The valve therefore remains closed until a more permanent displacement of the axle in the device keeps the circuit closed long enough to allow the armature 28ᵇ making contact with the valve spindle and forcing the same open.

Referring now to the form of construction of the suspension device disposed in the plane and hub of the wheel, adapted to accommodate a shaft drive to the rear wheels of a vehicle, Figs. 1 to 6 of the drawings illustrate one arrangement of the parts. Piston 1 of the device in this arrangement has a boss $1^c$ through the center adapted to be mounted upon the end of the hollow rectangular axle housing, the inner faces forming the vertical slot $2^c$ through which the driving shaft 63 rotates and oscillates in a vertical plane. The section of the opening through the boss $1^c$ permits the axle housing fitting snugly on the same securing the piston 1 in the vertical plane. To hold the latter endwise on the axle, the section of the axle $2^b$ forming the seat for the piston terminates on the inner side with the vertical shoulders $2^d$ which engage with the vertical faces of the counterbore $1^d$ of the piston. Two bolts $2^e$ are screwed into the faces $2^d$ and extend horizontally into the boss as far as the front face $1^f$ of the latter which is counterbored. The counterbore is deep enough to permit the piston being secured into position by means of the nuts $2^f$ and safety washers $2^g$.

The inner arm of the cylinder 3 is arranged as a guide to provide for the hollow axle or housing $2^a$ and the movement caused by the oscillation of the wheel on the axle. In the arm 5 vertical guides $5^a$ are disposed and adapted to engage with the vertical rubbing surfaces $2^h$ formed on the axle 2 which extend to the face of the brake fulcrum plate 65.

The brake fulcrum plate 65 is provided with a flange $65^a$ adapted to engage with the arm 5 and is slotted to accommodate the axle 2. It is secured to the arm 5 by the flange $65^a$ and bolts $65^b$. The plate 65 carries the brakes 66 and 67 and their respective fulcrums $66^b$ and $67^b$.

The shaft 63 is attached to the central driving shaft from the motor through the usual differential gears and universal joints 70 which are attached to the stub driving shaft 71 and secured to the differential gears from end movement by nuts 72.

The universal joints 70 are placed preferably close to the bearings 73 of the differentials permitting the shaft 63 being disconnected from the universal joints 70 through the inspection door $2^i$ in the rear of the axle housing 2.

The shaft 63 secured as above described is attached to the hub 8 of the wheel by a universal joint 64 attached to the cap 68 by pin $64^a$. There is a tessellated or squared end which engages with the sleeve $64^c$ of the universal joint 64 and is adapted to slide endwise. The cap 68 is secured to the hub 8 by the flange $68^a$ and bolts $68^b$. It also forms in some cases an end adjustment for the bearings 6 and 7.

To assemble and then mount the rear wheel in position on the axle housing 2, the piston 1 with the cup leather packing 11 and 12 and ring $12^b$ in position, is placed in position in the cylinder 3 of the suspension device through the top of the said cylinder. The cap is then bolted or screwed on and made air tight. The cylinder 3 is then placed in the outer part of the hub 8 after the bearings 6 and 7 have been mounted on the respective arms 4 and 5 of the cylinder. The inner side or door of the hub 8 is then bolted to the outer portion after the requisite quantity of oil has been inserted for lubrication and maintenance of the packing air tight. The plate 65 carrying the brake shoes 66 and 67 is then secured to the arm 5 of the cylinder 3 by the bolts $65^b$.

Before attempting to place the wheel on the axle care is taken to see that the counter bore $1^f$ in the face of the piston 1 faces the outside of the wheel and is placed so that the opening through the boss of the piston will be in line with the guides $5^a$ in the arm 5 and central with the latter.

The piston 1 and therefore the wheel can now be easily raised and pressed onto the axle end $2^b$ until the inner face of the piston is forced against the shoulder $2^d$ of the axle. The nuts $2^f$ and lock washers $2^g$ are then secured in position on the studs $2^e$ through the opening in the arm 4 by means of a suitable socket wrench.

To connect the wheel to the driving shaft the cap 68 is now placed in position after first sliding the sleeve $64^c$ onto the squared end of the shaft 63, the cap is then pressed into its place so that the shoulder on the cap fits into the hub face to keep it concentric with the latter. The nuts $68^b$ secure the cap to the hub. The air connection or hose from the supply piping communicating with the air compressor and reservoir on the chassis, connects with the cylinder 3 of the device by a union connection to the conduit 17 in the arm 5 of the cylinder.

A dust plate $65^c$ which slides on the axle housing end $2^b$ snugly is held up to the brake plate 65 by a spring or springs and is adapted to engage and slide on the said brake plate to keep dust from entering the slot in the arm 5.

The wheel which is now in position only requires the brake rod connections to be secured to the brake levers on the wheel and the suspension device is then ready for inflation as described.

Figs. 7, 8 and 9 of the drawings illustrate an alternative means of securing the wheel or piston 1 to the axle housing end $2^b$ in lieu of the studs or bolts $2^e$ and nuts $2^f$ which hold the piston endwise on the axle. This arrangement consists of a boss or projection $1^g$ formed on the face of the piston in the counterbore $1^f$ and is of the same diameter as the outer periphery of the upper and lower face of the axle housing end $2^b$ and concentric therewith. The axle end $2^b$ when the piston 1 is mounted in position and bears on its inner face against the shoulder $2^d$, extends outward to the face of the said boss $1^g$. The outer periphery of the boss $1^g$ and the upper and lower faces of the axle end are threaded to receive a lock ring $1^h$ having two lugs $1^i$ on the outer face of the ring, which are adapted to serve as means for locking the ring from turning by means of the studs $1^j$. These lugs also serve as a means for turning or screwing the ring into position through the arm 4 when the cap 68 is removed.

It is preferable that the supply of air in the reservoir shall be maintained at a sufficiently high pressure at all times to meet the maximum requirements of the said suspension devices when the maximum load is carried by the vehicle, provision may be therefore made to automatically start and stop the supply of air to the reservoir to maintain the pressure substantially constant to take care of any variation or demand made on it.

A check valve may also be provided in the main air supply conduit between the compressor and the air reservoir.

It is obvious that the relative elements forming the electric switch disposed between the wheel and the axle may be respectively attached to either of the latter or their parts without departing from the scope of the invention.

What I claim is:—

1. In anti-vibration devices of the type set forth including a cylinder and coöperating piston oscillated by the respective movements of a wheel hub and companion axle, means for maintaining a supply of air under pressure thereto by the relative movements of the piston in the cylinder of the device due to variations in the load supported by the air consisting of a source of compressed air, electro-magnetically operated air inlet valves in communication therewith admitting air to the cylinder, air escape valves communicating with the cylinder and the atmosphere, and means for forcing the said valves from their seats at predetermined positions of the cylinder and piston.

2. In anti-vibration devices of the type set forth including a cylinder and coöperating piston oscillated by the respective movements of a wheel hub and companion axle, means for maintaining a supply of air under pressure thereto, comprising a source of supply of air under pressure, electromagnetically operated air inlet valves in communication therewith for regulating the quantity of air to the cylinder, magnetically operated air escape valves from the device to atmosphere, electric switches operated by the relative movements of the piston in the cylinder due to the variation in the load supported, and frictionally retarded means for damping the action of the moving elements of each switch.

3. In anti-vibration devices of the type set forth including a cylinder and piston therefor, means for maintaining a supply of air under pressure thereto by the relative movements of the piston in the cylinder of the device, due to variation in the load supported by the air consisting of a means for supplying compressed air, electromagnetically operated air inlet valves in communication therewith for regulating the quantity of the air in the device, electric switches each adapted to control the supply of electricity to a valve, and each operated by the relative movement of the piston in the cylinder of the device, due to variation in the load supported, and means for damping or retarding the action of each valve.

4. In anti-vibration devices of the type set forth including a cylinder and piston therefor, means for maintaining a supply of air under pressure thereto by the relative movements of the piston in the cylinder of the device due to variation in the load supported by the air, consisting of a source of confined air, electromagnetically operated air inlet valves in communication therewith, regulating the quantity of air to the device, electrically operated outlet valves communicating with the said device and the atmosphere and regulating the escape of air therefrom, electric switches each adapted to control the supply of electricity to a valve, and each operated by the relative movement of the piston in the cylinder of the device due to variation in the load supported, and means for damping or retarding the action of the valves.

5. In anti-vibration devices of the type set forth including a cylinder and piston therefor, means for maintaining a supply of air under pressure thereto by the relative movements of the piston in the cylinder of the device due to variation in the load supported by the air, consisting of a source of confined air, electromagnetically operated air inlet valves in communication therewith, regulating the quantity of air to the device, air escape valves communicating with the respective device and the atmosphere and means for forcing the said valves from their seats at a predetermined position of the piston and cylinder.

6. In anti-vibration devices of the type set forth herein, a controlling switch consisting of a tube having an electric terminal in the lower head thereof extending into the tube, a piston reciprocable in the tube having spring terminal contacts adapted to engage with the head contacts, a sleeve closed at the outer end telescoping over the tube, a stem extending from the outer tube sleeve through the inner piston, and engaging against the inner face of the inner piston, a displacement spring around the stem in compression between the inner piston and the outer sleeve there being an air vent from the upper sleeve and tube to the atmosphere.

7. In anti-vibration devices of the type set forth, inlet valves, outlet valves, stems extending from the low pressure side of the valves into passages communicating both with the atmosphere and with a source of supply of air under pressure, an electromagnet secured at one end of the valves, a member secured to the opposite end, the core of the magnet having an opening into the interior of the valve, an armature in the chamber of the valve, a non-magnetic push rod on the armature passing through the core and operatively abutting the valve stem, means for seating the valve and returning the armature to initial position when the magnet is de-magnetized, and a cap closing the armature chamber.

In testimony whereof I affix my signature in presence of two witnesses.

GEORGE WILLIAM BELL.

Witnesses:
C. R. STICKNEY,
ANNA M. DORR.

Copies of this patent may be obtained for five cents each, by addressing the "Commissioner of Patents, Washington, D. C."